United States Patent [19]
Goldman

[11] 3,945,035
[45] Mar. 16, 1976

[54] METHOD AND MEANS FOR FILTERING AND AMPLIFYING SIGNAL COMPONENTS OF DESIRED FREQUENCY

[76] Inventor: Douglas Goldman, 170 E. McMillan St., Cincinnati, Ohio 45219

[22] Filed: May 8, 1974

[21] Appl. No.: 467,853

Related U.S. Application Data

[63] Continuation-in-part of Ser. No. 291,979, Sept. 25, 1972, abandoned.

[52] U.S. Cl. .................... 360/7; 360/18; 360/24; 360/54
[51] Int. Cl.² G11B 5/09; G11B 27/10; G11B 27/28
[58] Field of Search .............. 360/7, 24, 18, 54, 55, 360/121, 75, 109, 63

[56] References Cited
UNITED STATES PATENTS

| | | | |
|---|---|---|---|
| 699,630 | 5/1902 | Pedersen | 360/18 |
| 2,105,318 | 1/1938 | Goldsmith | 360/7 |
| 3,247,483 | 4/1966 | Wood | 360/121 |
| 3,378,825 | 4/1968 | Offner | 360/54 |
| 3,480,932 | 11/1969 | Brandstadter | 360/7 |
| 3,665,429 | 5/1972 | Thornley | 360/55 |

*Primary Examiner*—Alfred H. Eddleman
*Attorney, Agent, or Firm*—Melville, Strasser, Foster & Hoffman

[57] ABSTRACT

A method and means for filtering and intensifying signal components of a desired predetermined period of repetition wherein a plurality of recording heads in tandem arrangement are provided, adjacent recording heads being equally spaced from each other. A magnetic tape is drawn past the recording heads at a constant velocity. The recurring signal component of desired period of repetition is delivered to the recording heads simultaneously and in such a way that the portion of the magnetic tape upon which each individual recording of the desired signal component is made by each recording head reaches the next recording head simultaneously with the next such signal component. As a result the amplitude of the desired signal component is increased on the magnetic tape and the amplitude of all other periods of repetition is relatively reduced. The summated signal can be reproduced by means of a playback head and an appropriate readout means.

17 Claims, 2 Drawing Figures

METHOD AND MEANS FOR FILTERING AND AMPLIFYING SIGNAL COMPONENTS OF DESIRED FREQUENCY

CROSS REFERENCE TO RELATED APPLICATION

This is a continuation-in-part of the copending application Ser. No. 291,979, filed Sept. 25, 1972, now abandoned, in the name of the same inventor and entitled METHOD AND MEANS FOR FILTERING AND INTENSIFYING SIGNAL COMPONENTS OF DESIRED FREQUENCY.

BACKGROUND OF THE INVENTION

1. Field of the Invention

The invention relates to a method and means for filtering and intensifying electrical signals and more particularly to a method and means for filtering and intensifying weak signal components of predetermined desired period of repetition.

2. Description of the Prior Art

The method and means of the present invention have substantially unlimited application. For example, the present invention may be used to filter and amplify weak signals in association with radar, sonar, satellite tracking and the like.

The present invention is also well adapted to electrophysiologic research. In such an application the superimposing of effects of repetitive signals at fixed, relatively long periods of repetition, with concomitant relative cancellation of other periods of repetition, serves to record the responses at the desired period of repetition in magnified form with continuous response to changes in effect from cycle to cycle.

The method and means of the present invention may, for example, be used in brain studies to pick up and amplify signals from the brain normally masked by the total electric activity of the brain. Signals from the depth of the brain may be intensified and recorded from the surface of the head.

The present invention is also useful in chemical diagnosis and the like, wherein desired electrical signals generated by repetitive chemical actions in the body can be amplified and recorded.

Prior art workers have used a number of methods and a variety of apparatus to filter and amplify weak signals. For example, use has been made of computers such as a computer of average transients. A single recording head and a tape loop have been used to make multiple recordings of a signal initiated by a synchronizing signal. This is exemplified by U.S. Pat. No. 3,378,825. However, both of these methods and means are non-continuous, and neither is capable of continuously reproducing a weak signal in amplified form, showing changes in the signal from cycle-to-cycle.

U.S. Pat. No. 3,480,932 teaches an apparatus for increasing the signal-to-noise ratio of a recurring signal. The patent contemplates the use of a dual track closed loop magnetic tape or the like, an adder, a single recording head, a pickup head and an erasing head together with an auxiliary recording head, an auxiliary pickup head and an auxiliary erasing head. These auxiliary heads enable a synchronizing signal to be temporarily stored on the second track of the tape. This structure, however, does not make multiple recordings of a given signal which is intensified by summation as the signal is repeated and cannot continuously reproduce a weak signal in amplified form showing changes in the signal from cycle-to-cycle.

The present invention is directed to a method and means whereby the desired weak signal is simultaneously fed to a plurality of recording heads in such a way that the signals are superposed on a magnetic tape to continuously produce a recording of the desired signal with increased amplitude. Means may also be provided to reproduce the desired signal of increased amplitude through the use of a playback head and appropriate readout means.

SUMMARY OF THE INVENTION

The method and means of the present invention for filtering and amplifying weak signal components of a desired predetermined period of repetition makes use of a plurality of magnetic recording heads and an appropriate magnetic recording medium such as a magnetic tape. The recording heads are arranged in tandem and the distance between adjacent heads is equal. Means are provided to draw the magnetic tape past the recording heads at a constant velocity which may be varied according to the period of repetition which it is desired to record.

The signal containing the component to be filtered and amplified is fed simultaneously to all of the recording heads. By proper adjustment of the tape velocity, the equal distance between recording heads, or both, recordings of the individual recurring signals of the desired period of repetition will be superimposed on the magnetic tape to ultimately provide a recording of the desired signal component with increased (summated) amplitude, the amplitude of all other periods of repetition being reduced by cancellation.

The desired signals of increased amplitude may be reproduced by means of a playback head, amplifying means and appropriate readout means, as will be described herinafter.

When the desired signal has a frequency or period of repetition so low that the playback head will be insensitive to it, a chopper signal may be imposed upon the desired signal ahead of the playback head and an amplitude modulation detector may be provided ahead of the readout means to recover the desired signal.

DESCRIPTION OF THE PREFERRED EMBODIMENTS

Figure 1:
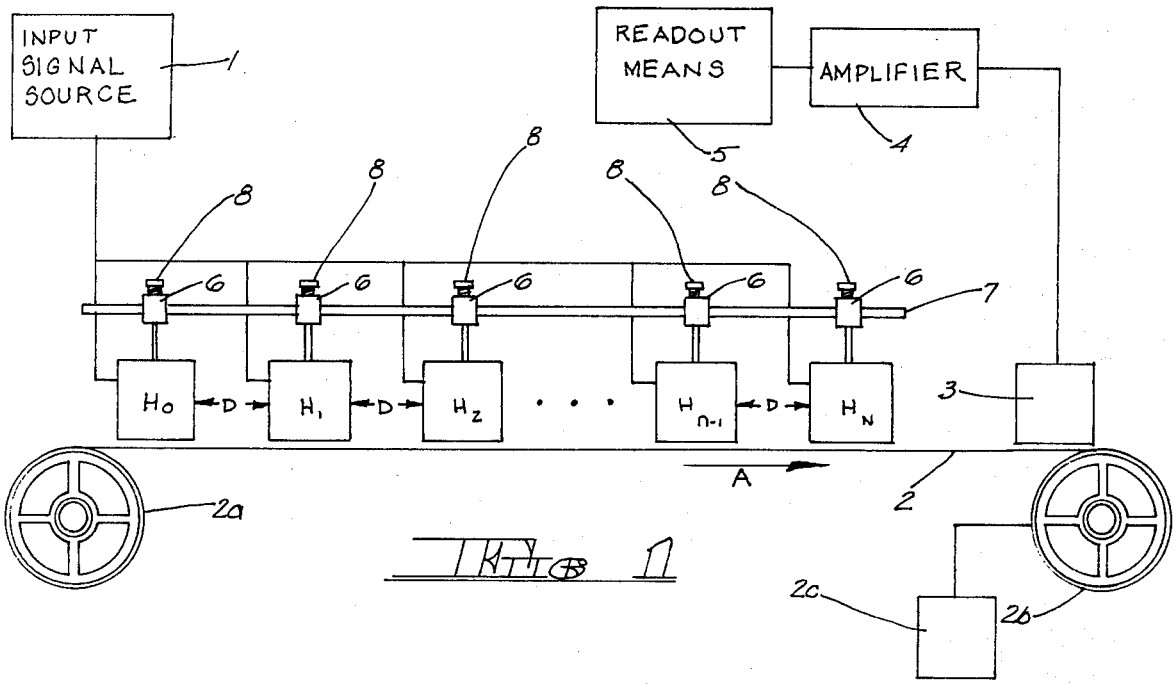
FIG. 1 is a diagrammatic representation of the system of the present invention.

A simple embodiment of the present invention is diagrammatically illustrated in FIG. 1. In this figure a series of magnetic recording heads is shown at $H_0$, $H_1$, $H_2$, $H_{n-1}$ and $H_n$. The three dots between recording heads $H_2$ and $H_{n-1}$ are intended to indicate that additional recording heads may be present. The number of heads used does not constitute a limitation on the present invention. The character and intensity of summating that can be achieved can be varied by changing the number of recording heads. This depends upon the nature of the results sought and the choice of the number of heads used is well within the skill of the worker in the art.

It is important to note, however, that the distance, D, between adjacent recording heads is equal. All of the recording heads are connected to an input signal source 1. The source 1 comprises the source of the signal containing the component sought to be filtered and amplified. The precise nature of the signal source 1 does not constitute a limitation on the present invention. For example, in the study of the brain, the signal source may be one or more scalp electrodes.

A magnetic recording medium is indicated at 2. The recording medium 2 may take any suitable form and generally will constitute a magnetic tape as shown. Means are provided to draw the magnetic tape 2 across the recording heads $H_0$ through $H_n$ in the direction of arrow A. The means to draw the tape across the recording heads may be an appropriate and conventional tape deck as is diagrammatically represented in FIG. 1 by reels 2a and 2b. The tape 2 is caused to move at a desired constant velocity, $v$.

As will be discussed hereinafter, the system thus far described will provide on the tape 2 a recording of the desired signal component of increased amplitude, the amplitude of all other periods of repetition being relatively decreased. The system may also include means to reproduce the desired signal of increased amplitude. To this end, a playback head is shown at 3. In its simplest form, the reproduction portion of the system will generally include an amplifier 4. The output of the playback head 3 is connected to the input of the amplifier 4. The output of the amplifier 4, in turn, may be connected to the input of a suitable readout means 5.

The amplifier 4 may be of any suitable and well known type, depending upon the nature of the signal and the nature of the readout means 5. The readout means, itself, may take any suitable form including means for recording the signal component on paper, a thermograph, an oscilloscope, or the like.

The operation of the system of FIG. 1 may be described as follows. The recurring signal containing the signal component sought to be filtered and amplified is fed simultaneously to all of the recording heads $H_0$ through $H_n$ from the source 1. The tape 2 is caused to move past the heads at a constant velocity ($v$). The velocity is so chosen that $D/v$ will equal the period of the signal component sought to be recorded.

At the first occurrence of the input signal, all of the recording heads will record it on the tape 2. At the second occurrence of the signal from source 1 all of the recording heads will again record the signal on tape 2. However, it will be apparent that each of heads $H_1$ through $H_n$ will superpose this last mentioned recording upon the recording of the first occurrence of the signal made by the preceding one of the heads. This process continues and, as a consequence, that portion of tape 2 which has passed the last recording head $H_n$ will have thereon a recording wherein that component in the signal from source 1 having a period of $D/v$ will have retained its wave shape and have been increased in amplitude by a factor of $(n + 1)$, the number of heads. By the same token, other components of the input signal, on average, will have been increased by a factor of only $\sqrt{n+1}$, and will have lost their wave shape. Thus, the undesired components of the signal from source 1 will have been decreased in amplitude by the phenomenon of cancellation.

By virtue of this method of recording, the system of FIG. 1 will have a factor of selectivity for the desired recurring signal component having a period of $D/v$. If S be designated as this selectivity factor, the selectivity factor may be stated as follows:

$$S = \frac{n+1}{\sqrt{n+1}} = \sqrt{n+1}$$

For purposes of fidelity, proper reproduction of wave form and the prevention of distortion, the tape 2 should be operated in the linear range of its magnetization curve, as is well known in the art. If $s(t)$ is used to represent the input signal, the magnetization of the tape $m(t)$ may be stated as follows:

$$m(t) = A\left[s(t) + s\left(t - \frac{D}{v}\right) + s\left(t - \frac{2D}{v}\right) + \ldots + s\left(t - \frac{nD}{v}\right)\right]$$

In the above formula, A represents the amplification, D again represents the distance between the recording heads, and $v$ represents the velocity of the tape 2.

When it is desired to record a wave component of a predetermined period, the system of FIG. 1 may most conveniently be adjusted for that period simply by changing the velocity, $v$, of the magnetic tape. Tape decks having means to vary the speed of the tape are well known in the art. Tape speed may be varied in a number of well known ways. For purposes of an exemplary showing, the tape deck 2a–2b of FIG. 1 is diagrammatically illustrated as having a variable speed motor 2c. The actual tape speed control means used does not constitute a limitation on the present invention. It would be within the scope of the invention, however, to select the period of repetition by changing the distance, D, between the recording heads or adjusting both D and $v$. The actual means used to change the distance, D, between the recording heads again does not constitute a limitation on the present invention. For purposes of an exemplary showing, each of the heads may be provided with a support means 6 slidable along a rod-like mounting 7 and lockable in position by set screw means 8. The sophistication of the head support means may be as great as is required for the application to which the present invention is directed. Micromotor-type support means may be used, for example, for precision location of the recording heads.

Figure 2:
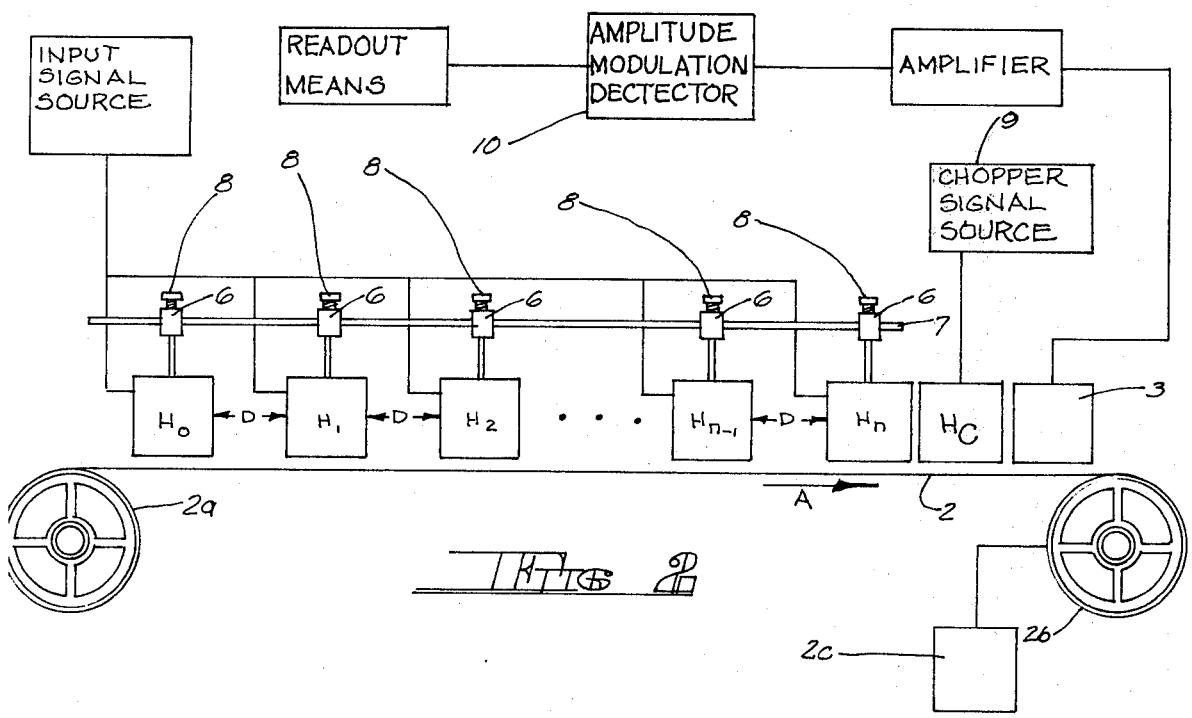
FIG. 2 is a diagrammatic representation of another embodiment of the system of the present invention.

In some physiological applications, for example, the periods of repetition of the signal components of interest may have fundamental frequencies as low as a few cycles per second, or even lower. At such low frequencies, the reproducing portion of the system may be insensitive. To overcome this difficulty, the recorded signal, after the last recording head $H_n$ may be modified by introducing a chopper signal, as is well known in the art. To illustrate this, reference is made to FIG. 2. FIG. 2 is a diagrammatic representation of a modified form of the system of the present invention. In most respects, the system of FIG. 2 is similar to that of FIG. 1 and like parts have been given like index numerals.

In this embodiment a chopper signal source 9 may be provided connected to an additional head $H_C$ ahead of playback head 3. This chopper signal would block out alternate intervals of the magnetization at a relatively high frequency, for example a frequency of 1 Khz. An amplitude modulation detector 10, well known in the art, may be connected intermediate the amplifier 4 and readout means 5. After playback and amplification the envelope of the chopped signal from the amplifier may be recovered by the amplitude modulation detector and fed to readout means 5.

Modifications may be made in the invention without departing from the spirit of it. For example, referring again to FIG. 1, it would be possible to have each of the rectangles $H_0$ through $H_n$ represent a light source rather than a recording head. Each of the light sources would be identical. In this instance index numeral 2 would represent a strip of photographic film, rather than a magnetic tape. Finally, the rectangular marked 3 would represent a means to measure density of film 2, rather than a playback head.

With this modified system, substantially the same result is achieved in much the same way. The film would be drawn past the light sources at a predetermined constant velocity and the light sources, being simultaneously energized by the input signal, would each superpose a signal on the film on the previous signal imposed by the preceding one of the light sources. The means to measure the density of the film would serve in much the same way as the playback head described above, converting the changes in density of the film to an electrical signal. This signal, in turn, would be acted upon by amplifying means 4, the output of which would be connected to an appropriate readout means 5.

The embodiments of the invention in which an exclusive property or privilege is claimed are defined as follows:

1. A system for intensifying a desired component of a recurring signal comprising a plurality of signal recording elements arranged in sequence, means to combine the recording of said elements, the recording of each element being simultaneous with respect to the recording of the other recording elements of said sequence and intensifying by summation only said desired component while continuously reflecting changes therein from cycle to cycle.

2. The structure claimed in claim 1 including means to adjust the spacing of said recording elements in said sequence.

3. A magnetic tape recording device for intensifying a desired component of a recurring signal comprising a plurality of magnetic signal recording heads and a magnetizable tape, means to move said tape past said heads, said heads being arranged to superimpose a sequence of recordings of said recurring signal upon said tape as said tape moves past said heads such that said recordings on said tape intensify by summation only said desired component and continuously reflect changes therein from cycle to cycle, there being a constant time delay between successive recordings in sequence.

4. The structure claimed in claim 3 including means to adjust said constant time delay.

5. The structure claimed in claim 3 including playback means to continuously reproduce said intensified signal.

6. A system for amplifying a desired component of a recurring signal while continuously reflecting changes therein from cycle to cycle, said system comprising a plurality of magnetic recording heads arranged in tandem, a magnetizable recording medium, means to move said recording medium past said recording heads, means for feeding said recurring signal containing said desired component to all of said recording heads simultaneously and means whereby all of said recording heads record the first occurrence of said signal component and thereafter each of said heads except the first superposes a recording of each subsequent occurrence of said signal component upon the recording of said recording medium of the previous occurrence of said signal component made by the preceding one of said heads, thus continuously producing on said recording medium a recording of said signal component of increasing amplitude.

7. The structure claimed in claim 6 wherein said recording medium comprises a magnetic tape.

8. The structure claimed in claim 6 wherein the distance between adjacent ones of said heads is the same, said means to move said recording medium past said heads moving said recording medium at a predetermined constant velocity.

9. The structure claimed in claim 6 including a playback head to continuously reproduce said desired component, said playback head following said recording heads, an amplifier, the output of said playback head being connected to the input of said amplifier, a readout means, the output of said amplifier being connected to the input of said readout means.

10. The structure claimed in claim 6 including adjustment means for said system whereby said system may be made substantially selective to a recurring signal component of desired period of repetition.

11. The structure claimed in claim 8 including adjustment means for said system whereby said system may be made substantially selective to a recurring signal component of desired period of repetition.

12. The structure claimed in claim 9 including a chopper signal source, means for imposing said chopper signal on said recording medium ahead of said playback head to produce a chopped signal from said playback head, an amplitude modulation detector connected between said playback head and said readout means to recover the envelope of said chopped signal.

13. The structure claimed in claim 11 wherein said adjustment means comprises means to adjust said velocity of said recording medium.

14. The structure claimed in claim 11 wherein said adjustment means comprises means to adjust the distance between adjacent ones of said recording heads.

15. A method of amplifying a desired component of a recurring signal while continuously reflecting changes therein from cycle to cycle, said method comprising the steps of providing a plurality of magnetic recording heads arranged in tandem, providing a magnetizable recording medium, moving said recording medium past said heads, feeding said recurring signal to all of said heads simultaneously, causing all of said heads to record the first occurrence of said signal component and thereafter causing each of said heads except the first to superpose a recording of each subsequent occurrence of said signal component upon the recording on said recording medium of the previous occurrence of said signal component made by the preceding one of said heads, whereby to continuously produce on said recording medium a recording of said signal component of increasing amplitude.

16. The method claimed in claim 15 including the step of continuously reproducing said signal component of increased amplitude by means of a pickup head, an amplifier and readout means.

17. The method claimed in claim 16 including the steps of imposing a chopper signal upon said intensified signal ahead of said pickup head and recovering said intensified signal by means of an amplitude modulation detector before said readout means.

* * * * *